United States Patent [19]

Fowler et al.

[11] Patent Number: 4,628,439
[45] Date of Patent: Dec. 9, 1986

[54] SUPERVISED START SYSTEM FOR MICROPROCESSOR BASED APPLIANCE CONTROLS

[75] Inventors: Daniel L. Fowler, Kentwood; Brian J. Kadwell, Holland, both of Mich.

[73] Assignee: Robertshaw Controls Company, Richmond, Va.

[21] Appl. No.: 560,169

[22] Filed: Dec. 12, 1983

[51] Int. Cl.[4] .................. G05B 9/02; G05B 15/02; H05B 6/64
[52] U.S. Cl. .................................... 364/138; 364/186; 219/10.55 B
[58] Field of Search .............. 364/138, 140, 141, 142, 364/143, 144, 186, 188, 189, 557, 184–185, 400, 477; 219/10.55 B, 10.55 C, 10.55 A, 10.55 R, 490, 488, 483; 361/1, 78, 156

[56] References Cited

U.S. PATENT DOCUMENTS

| | | | |
|---|---|---|---|
| 3,753,003 | 8/1973 | Mazza | 219/10.55 B |
| 4,009,359 | 2/1977 | Tallmadge et al. | 364/557 X |
| 4,197,581 | 4/1980 | Watrous et al. | 364/184 |
| 4,275,464 | 6/1981 | Schmidt | 364/186 |
| 4,365,289 | 12/1982 | Small et al. | 364/144 X |
| 4,398,233 | 8/1983 | Bala et al. | 364/186 |
| 4,415,887 | 11/1983 | Kawase | 219/10.55 B |
| 4,418,262 | 11/1983 | Noda | 219/10.55 B |
| 4,420,669 | 12/1983 | Scalf et al. | 219/10.55 R |
| 4,481,393 | 11/1984 | Ueda | 219/10.55 B |

Primary Examiner—Joseph Ruggiero
Assistant Examiner—Jon D. Grossman
Attorney, Agent, or Firm—James A. Wong

[57] ABSTRACT

A supervised start system for microprocessor based appliance controls and effective to prevent unwanted start operation of the associated appliance due to failure of a critical component of the starting system. The starting system requires a mechanical operation to effect starting of the associated appliance and the system tests all critical components thereof and failure of one component thereof will either render the associated appliance inoperative or cause an obvious but safe malfunction of the associated appliance.

15 Claims, 1 Drawing Figure

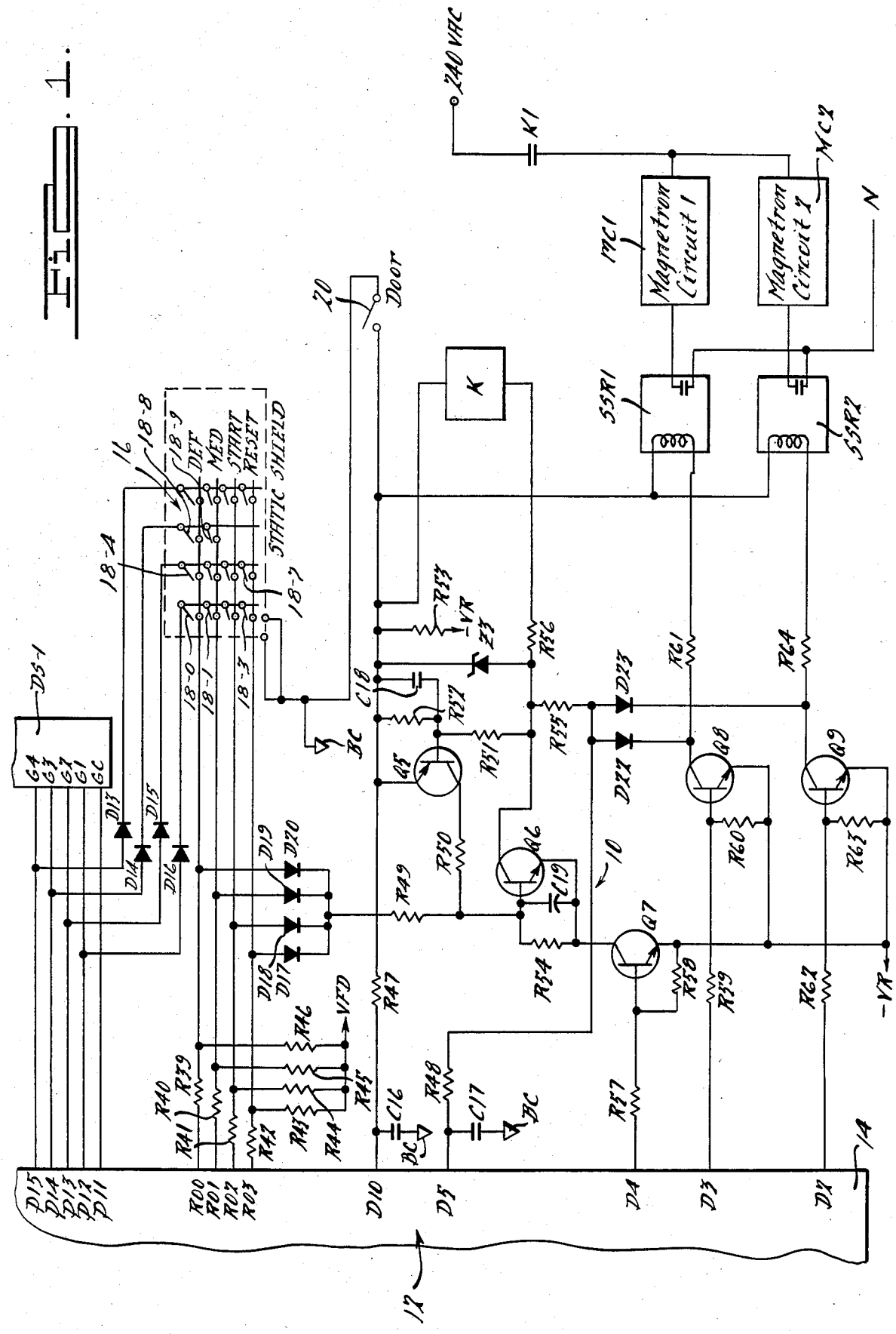

SUPERVISED START SYSTEM FOR MICROPROCESSOR BASED APPLIANCE CONTROLS

CONTINUING DATA

This case contains related subject matter to copending application Ser. No. 750,066.

BACKGROUND OF THE INVENTION

1. Field of the Invention

This invention relates to microprocessor based appliance controls and, more particularly, to an improved supervised start system for microprocessor based appliance controls.

2. Description of the Prior Art

Heretofore, microprocessor based appliance controls have been utilized for controlling a wide variety of household appliances such as microwave ovens, dishwashers, washing machines, television sets and other appliances. Such microprocessor based appliance controls have become increasingly sophisticated as a result of the increasing versatility and capabilities of microprocessors which are programmed to perform a multitude of functions with integrated circuit components. However, age, environmental conditions and other factors sometimes cause critical components of the starting systems of the microprocessor based appliance controls, including the microprocessors themselves, to fail with the result that "phantom starts" may occur, i.e. a critical component of the starting circuitry of the microprocessor based appliance control may fail with the result that an unattended appliance, such as a microwave oven, may start and lock into a full power mode or other condition which is considered unsafe. By way of example, in a microwave oven, any unattended start of magnetron operation is considered unsafe.

SUMMARY OF THE INVENTION

An object of the present invention is to overcome disadvantages in prior microprocessor based appliance controls of the indicated character, and to provide an improved supervised start system for microprocessor based appliance controls incorporating improved means for preventing unwanted and possibly unsafe start of operation of the associated appliance due to failure of a critical component of the starting system.

Another object of the present invention is to provide an improved supervised start system for microprocessor based appliance controls which requires human intervention before the associated appliance can be activated.

Another object of the present invention is to provide an improved supervised start system for microprocessor based appliance controls which requires a mechanical operation to effect starting of the associated appliance and which prevents any unsafe operation of the associated appliance in the event one component of the system fails.

Another object of the present invention is to provide an improved supervised start system for microprocessor based appliance controls wherein the energy required to operate the system can only be supplied through mechanical means which requires a person to be present to initiate operation of the associated appliance.

Another object of the present invention is to provide an improved supervised start system for microprocessor based appliance controls, which system supervises or tests all critical components thereof and which critical components must not be defective and must be fully functional if energization of the associated appliance is to be effected.

Another object of the present invention is to provide an improved supervised start system for microprocessor based appliance controls wherein at least two components thereof must fail before an unattended appliance can self-start.

Another object of the present invention is to provide an improved supervised start system for microprocessor based appliance controls wherein failure of one component thereof will either render the associated appliance inoperative or cause an obvious but safe malfunction which will prompt a service call.

Still another object of the present invention is to provide an improved supervised start system for microprocessor based appliance controls which, prior to starting the associated appliance, checks the microprocessor incorporated in the control as well as all critical components of the system the failure of which could cause unsafe starting of the associated appliance.

Yet another object of the present invention is to provide an improved supervised start system for microprocessor based appliance controls which provides improved appliance control and which is economical to manufacture and assemble, durable, efficient and reliable in operation.

The above as well as other objects and advantages of the present invention will become apparent from the following description, the appended claims and the accompanying drawings.

BRIEF DESCRIPTION OF THE DRAWING

The single FIGURE in the drawing is a schematic circuit diagram of a supervised start system for microprocessor based appliance controls embodying the present invention, showing the same applied to a microprocessor based appliance control.

DETAILED DESCRIPTION OF A PREFERRED EMBODIMENT

Referring to the drawing, a preferred embodiment of the present invention is schematically illustrated therein and is comprised of a supervised start system, generally designated 10, particularly adapted for use in supervising a microprocessor based appliance control, generally designated 12, only portions of which are illustrated so as to show the connection of the present invention therewith. The microprocessor based appliance control 12 includes a conventional microprocessor 14 which preferably is an HMCS-44A microprocessor manufactured by Hitachi Ltd., Nippon Building, 6-2, 2-Chome, Ohtemachi, Chiyoda-Ku, Tokyo, 100, Japan, although it will be understood that if desired, other microprocessors may be utilized. The microprocessor 14 includes output ports D2, D3, D4, P11, P12, P13, P14 and P15, and input ports D5, D10, R00, R01, R02 and R03. In the embodiment of the invention illustrated, the control 12 is of the type which is particularly adapted to control a microwave oven although it will be understood that the present invention is applicable to other uses. For example, supervised start systems embodying the present invention may be applied to other microprocessor based appliance controls, such as microprocessor based controls for dishwashers, washing machines, dryers, television sets and other appliances.

The control 12 also includes a conventional crosspoint matrix push-button keyboard circuit, generally designated 16, which includes a plurality of normally open switches such as 18-0 through 18-9 that are incorporated in a conventional push-button keyboard (not shown) of the type requiring the application of manual or other physical force to effect closure of the normally open switches 18-0 through 18-9. If desired, additional switches, such as reset, start and defrost switches may also be incorporated in the keyboard circuit. The keyboard circuit 16 also includes diodes D13, D14, D15, D16, D17, D18, D19 and D20, and resistors R39, R40, R41, R42, R43, R44, R45 and R46. In addition, the control 12 includes a conventional door switch 20 which is closed when the microwave oven door is closed, a relay K having normally open contacts K1 which, when closed, connect two magnetron circuits MC1 and MC2 to a conventional source of 240 volt AC power supply, the magnetron circuits MC1 and MC2 in turn being controlled by conventional solid state relays SSR1 and SSR2. In a microwave oven, the relay K may also be provided with additional normally open contacts (not shown) which control the energization of the oven fan conventionally provided in microwave ovens.

In the embodiment of the invention illustrated, the supervised start system 10 is adapted to be connected to conventional power supplies, such as a $-15$ volt DC power supply $-VR$ and a $-30$ volt DC power supply $-VFD$ supplied by any desired or conventional means incorporated in the appliance control 12. The start supervision system 10 includes transistors Q5, Q6, Q7, Q8 and Q9; capacitors C16, C17, C18 and C19; a zener diode Z3; resistors R47, R48, R49, R50, R51, R52, R53, R54, R55, R56, R57, R58, R59, R60, R61, R62, R63 and R64; and diodes D22 and D23. The various components of the above described circuitry are all electrically connected, by suitable conductors, as illustrated in the drawing and as will be described hereinafter in greater detail.

The microprocessor 14 is programmed to supply signals from the output ports P11, P12, P13, P14 and P15 to a conventional multiplexed vacuum fluorescent arabic numeral display DS-1 which includes 5 digit grids, four of which have conventional seven segment arabic numeral displays which may be utilized, for example, to form a figure 8 in the conventional manner. The other grid is a colon grid disposed between the second and fourth numeral displays. With such a construction, the display DS-1 may be utilized to display selected time, temperature, power or other information to the user of the associated appliance.

The system 10 is adapted to supervise the energization of the two high voltage magnetron circuits MC1 and MC2, and requires that all critical components effective to energize the high voltage circuits be normal and that an electromechanical operation, i.e., a valid start key be effected to energize the high voltage circuits. The high voltage circuits of the appliance control are energized by operating the relay K to close the contacts K1. The relay K is connected to the output of the door switch 20 which provides board common (BC) when the door switch is closed. Thus, the magnetron circuits will not be energized unless the microwave oven door is closed. The relay K is also connected to the $-VR$ power supply ($-15$ volts DC) when supervisory conditions are met. This occurs when both the transistor Q6 and the transistor Q7 are turned on. However, in order for both the transistor Q6 and the transistor Q7 to turn on, the following sequence must occur. First a mechanical operation to close any switch in the keyboard circuit 16 must be effected. Closure of a particular switch could, for example, initiate a corresponding cooking time preprogrammed into the microprocessor 14. The microprocessor 14 is programmed to continuously provide positive strobe pulses to the keyboard circuit 16 from the output ports P12, P13, P14 and P15, through the diodes D13, D14, D15 and D16 as illustrated in the drawing. Assuming, for example, that a pushbutton on the keyboard has been manually operated so as to close the switch 18-1 associated therewith, the positive pulse from the microprocessor output port P12 passes through the diode D16, through the switch 18-1, through the resistor R40 to the microprocessor input port R01. The positive pulse from the output port P12 is also supplied from the closed switch 18-1 through the diode D19 and resistor R49 to the base of the transistor Q6. At this time, the transistor Q6 is inhibited from turning on because the transistor Q7 has not been turned on by the microprocessor output port D4. The microprocessor 14 is programmed so that a positive pulse at any of the microprocessor input ports R00, R01, R02 or R03 is recognized by the microprocessor as a potential key closure. The microprocessor 14 is programmed so that after a 10 millisecond delay, the microprocessor 14 retests the input ports R00, R01, R02 and R03 and confirms a valid key closure if the positive pulse is still present. The microprocessor is programmed to recognize the valid closure of a numeric key on the keyboard, and the microprocessor 14 is programmed to then turn off the positive strobe pulses from the output ports P12, P13, P14 and P15 which removes the positive pulse applied, through the path previously described, to the base of the transistor Q6. Since the switch 18-1 was closed, the microprocessor 14 recognizes that a valid start command has been initiated. The microprocessor is programmed to retrieve any preprogrammed cooking time or other information associated with switch 18-1, such retrieval being from the microprocessor memory. The microprocessor next executes a sequence of tests to supervise the safe energization of the high voltage circuits, the purpose of the tests being to find any faults in critical components of the system 10 prior to energizing the relay K.

The microprocessor 14 is programmed so that initially the output pulses from the microprocessor ports P12, P13, P14 and P15 are turned off. The microprocessor next checks for any shorted fault condition of the transistors Q5, Q6, Q8 and Q9. The accomplish this, the microprocessor is programmed to turn on output port D4 which provides a positive signal through the resistor R57 to the base of the transistor Q7 to turn the transistor Q7 on. When the transistor Q7 is turned on, $-15$ volts DC from the source $-VR$ is applied to the emitter of the transistor Q6. The microprocessor 14 is programmed to next check the logic level at the input port D5. If the transistors Q5, Q6, Q8 and Q9 are in their normal off state, the input logic level at the port D5 will be high. If any of the transistors Q5, Q6, Q8 and Q9 have a shorted fault condition, the logic level at the port D5 will be low, which initiates a supervisory error sequence that will be described hereinafter in greater detail.

Assuming a fault condition has not been detected at the microprocessor port D5, the microprocessor is programmed to again turn on the output ports P12, P13, P14 and P15 and, assuming the switch 18-1 is closed, the pulse from the output port P12 is applied through the keyboard switch 18-1, to the base of the transistor Q6 which is turned on. Assuming the door switch 20 is closed, when the transistor Q6 is turned on, −15 volts DC is applied from the power supply −VR, through the resistor R56 to energize the relay K. Simultaneously, the −15 volt level at the collector of the transistor Q6 is applied through the resistor R51 to the base of the transistor Q5 to turn the transistor Q5 on and apply a positive level through the resistor R50 back to the base of the transistor Q6 so as to provide a regenerative latching on of the transistor Q5 and the transistor Q6. At this point, the switch 18-1 may be released and/or the microprocessor 14 turns off the pulses emanating from the output ports P12, P13, P14 and P15. However, the transistor Q5 and the transistor Q6 remain in a latched on condition due to the regenerative action previously described. Since the transistors Q5 and Q6 are in a latched on condition, the relay K will remain in an energized state. The microprocessor is programmed so that after a 10 millisecond delay, the microprocessor tests the logic level at the input port D5 for a low logic level. Such test assures that the output port D4 turned on prior to energizing the magnetron output. If the output port D4 did not turn on, a supervisory error sequence is initiated as will be described hereinafter in greater detail. Assuming that an error condition does not exist, the microprocessor is programmed to initiate a 3.2 second delay and commences turning on the magnetron output ports D2 and D3 as programmed. As the start supervisory sequence previously described is being executed, the critical components, namely the microprocessor, the transistors Q5, Q6, Q7, Q8 and Q9 and their corresponding innerconnective passive components are supervised and/or tested for an open and short fault condition. If a fault is detected during the start supervisory sequence, the start supervisory sequence is terminated and a supervisory error sequence is initiated as previously noted. Examples of this supervisory error detecting and resulting sequences are as follows:

EXAMPLE 1

Failure of the transistor Q7. If the transistor Q7 fails in an open mode, −15 volts DC cannot be supplied to the relay K from the power supply −VR, and the relay K will not operate. Consequently, the magnetron circuits MC1 and MC2 cannot turn on because the contacts K1 are open. If the transistor Q7 fails in a shorted mode, such shorted mode will be detected by the start supervisory sequence as follows: the microprocessor output pulses from the output ports P12, P13, P14 and P15 are interfaced to the base of the transistor Q6 via the keyboard switch paths previously described. If the transistor Q7 is shorted, the transistor Q6 is allowed to turn on and latch via the regenerative feedback of the transistor Q5 as previously described and the relay K will be energized. The −15 volt DC level at the collector of the transistor Q6 passes through the resistor 55 and the resistor 48 to the input port D5 of the microprocessor 14. The microprocessor is programmed to detect this low logic level as a fault during the subsequent start supervisory sequence and the microprocessor is programmed so that it will not turn on the magnetron output ports D2 and D3 of the microprocessor. Thus the error is indicated by a nonfunctional mode of operation, i.e. any fan provided in the microwave oven will run but the oven will not provide cooking power, which should prompt a service call. Since the magnetrons do not turn on, a safe condition exists.

EXAMPLE 2

Failure of the transistor Q6. If the transistor Q6 fails in an open mode, −15 volts DC will not be supplied from the power source −VR to the relay K with the result that the relay K will not operate and the contacts K1 will not close thereby preventing the magnetron circuits MC1 and MC2 from turning on. If the transistor Q6 fails in a shorted mode, such shorted mode is detected by the start supervisory sequence as follows. The microprocessor output port D4 supplies a high level which passes through the resistor R57 and turns on the transistor Q7. Since the transistor Q6 is shorted, this supplies −15 volts from the source −VR to the relay K. The −15 volt DC at the collector of the transistor Q6 also passes through the resistor R55 and through the resistor R48 to the microprocessor input port D5. The microprocessor is programmed to detect this low logic level as a fault condition, and the microprocessor terminates the start sequence by turning the output port D4 of the microprocessor off. If the microprocessor output port D4 is off, the microprocessor is programmed so that the magnetron output ports D2 and D3 of the microprocessor will not turn on thereby preventing operation of the magnetron circuits MC1 and MC2.

EXAMPLE 3

Failure of the transistor Q5. If the transistor Q5 fails in an open mode, the regenerative latching action of the transistors Q5 and Q6 is inhibited. This nonlatching condition of the transistors Q5 and Q6 is detected by microprocessor after the microprocessor output pulses from the output ports P12, P13, P14 and P15 are terminated. The microprocessor is programmed to check the input port D5 of the microprocessor for a low logic level indicating that the output to the relay K has latched to a low state. If this condition does not exist, the microprocessor is programmed to terminate the start sequence by turning the output port D4 of the microprocessor off. The symptom is indicated by the oven fan motor refusing to start and the failure of the magnetrons to turn on and provide cooking power, which is a safe condition. If the transistor Q5 fails in a shorted mode, such condition is detected in the same manner that a failure of the transistor Q6 is detected in a shorted mode, as previously described.

EXAMPLE 4

Failure of the transistors Q8 or Q9. The transistors Q8 and Q9 are not tested for an open failure mode because such failure does not present a safety issue since the associated magnetrons will not turn on, which results in poor cooking performance that should prompt a service call. If the transistors Q8 or Q9 fail in a shorted mode, a low logic level −15 volts DC will be applied through the diode D22 or the diode D23 through the resistor R48 to the microprocessor input port D5. This condition is detected during the start supervisory sequence, and inhibits the latchup of the transistors Q5 and Q6 by terminating the high output level at the microprocessor port D4 which turns off the transistor Q7. The value of the resistor R55 is such that the resistor R55 prevents the low logic level at the anodes of the diodes D22 and D23 from energizing the relay K when a shorted condition exists for the transistors Q8 or Q9.

EXAMPLE 5

Failure of the microprocessor 14. A worst case failure mode for the microprocessor 14 is for all outputs to be turned on to a high logic level. This is the equivalent of forcing board common to all output ports. The main issues are the logic levels at the microprocessor input ports R00 through R03. If any or all of these microprocessor ports are at a high logic level, they can source a positive potential through the resistors R39 through R42 and through the diodes D17 through D20, and through the resistor R49 to the base of the transistor Q6 which is a condition similar to the mechanical operation of a keyboard switch. However, the resistors R39 through R42 form voltage divider networks with the resistors R43 through R46 which are referenced to $-30$ volts DC from the power supply $-$VFD. These voltage dividers limit the voltage potential at the anodes of the diodes D17 through D20 more negative than $-15$ volts DC thereby preventing the forward bias of the diodes D17 through D20 and subsequent biasing of the transistor Q6 to the on state. An alternate means of preventing transistor Q6 turn on is the sizing of the resistors R39 through R42 and R49 and R54 to prevent bias currents from the microprocessor input ports R00 through R03 to develop sufficient potential amplified by the gain of the transistor Q6 from turning on the relay K, but adequate energies to bias the transistor Q6 on can only be sourced through the keyboard path which requires a mechanical operation. The other microprocessor outputs are also supervised by the inhibiting action of the transistor Q6. For example, the microprocessor output ports D4 and D3 and the output port D2 can also fail in a high logic state. However the path to turn on the high voltage circuitry is blocked by the transistor Q6 remaining in the off state until the mechanical operation of a key closure switch occurs. This prevents the relay K from operating and thereby inhibits the high voltage circuits.

If there are failures in any of the resistors, capacitors or diodes, such failures will produce detectable symptoms and responses comparable to the shorting or opening of the transistors and will also be detected. For example, if the resistor R51 fails open, the transistor Q5 would appear to be open. If the resistor R51 shorted, then the transistor Q5 would fail either open or shorted. As another example, if the capacitor C18 is shorted, the transistor Q5 would appear to be open. If the resistor R52 is shorted, the transistor Q5 would appear to be open. Similar results are obtained if failure of the other passive components occurs. Moreover, the system 10 is constructed in such a manner that if all outputs on the microprocessor fail, the system will still not effect a "phantom start" because a keyboard switch has not been closed. Moreover, the microprocessor is programmed so that the input port D10 must detect that the door switch 20 has been opened and closed by opening and closing the microwave oven door before pulses are applied to the output ports P12, P13, P14 and P15 to enable the keyboard circuit 16. It should also be understood that while the foregoing sequences have been described with reference to the closure of the keyboard switch 18-1, the sequences are similar no matter which keyboard switch is closed by pushing a button on the associated keyboard.

From the foregoing, it will be appreciated that the supervised start system embodying the present invention is essentially a diagnostic test of the components that occurs every time the microwave oven is started, and that through a series of logic checks, it is determined whether the driver circuits are functioning normally. Depending on the failure, the controller will respond by refusing to start, but in some cases will produce an obvious but safe oven malfunction prompting a service call. Without this protection, component failures could cause self-starting problems. The transistors Q5 and Q6 form a regenerative arrangement with one transistor forward biasing the other. Once conduction has started, no external signal is needed to maintain conduction. The turn-on characteristics are controlled by capacitor C18/resistor R52, resistor R54/capacitor C19, resistor R50 and the resistor R51. The positive keyboard pulse is derived through the isolation diodes D17 through D20 and R49. From the foregoing, it will be appreciated that the output of the transistor Q7 sinks current to the $-15$ volt $-$VR supply whenever the output port D4 of the microprocessor goes high. Instead of directly driving the output, the transistor Q7 is in series with the transistor Q6. Neither one can singly turn on the relay K. In addition, the transistor Q6 cannot turn on unless the transistor Q7 is on. Once on, the transistor Q6 will not turn off until the transistor Q7 is off, the load provided by the relay K is removed or the door switch 20 is opened. The resistor R53 is a pulldown resistor to ensure that the door sense line goes low when the door is opened. The microprocessor input D10 serves as the door sense input buffered by the resistor R47 and the capacitor C16. The resistor R56 limits current to the zener diode Z3 which is a "catch" diode to absorb the inductive kick of the relay K.

The input port D5 of the microprocessor monitors the relay output status through the decoupling network comprised of the capacitor C17 and the resistors R48 and R55. As an added safety feature, the magnetron output ports D2 and D3 of the microprocessor are also monitored through the isolation diodes D22 and D23. These outputs are logic OR'D with the output of the relay K in such a way that an error condition is detected if the transistor Q8 or the transistor Q9 is shorted. Otherwise the transistors Q8 and Q9 sink current to the $-15$ volt $-$VR supply when the microprocessor output ports D2 and D3 dictate it. Resistors R61 and R64 are current limiting voltage dropping resistors disposed between the collectors of the transistors Q8 and Q9 and the solid state relays SSR1 and SSR2, respectively. The remaining components protect the other components from line transients, voltage spikes and other factors that could damage and/or cause malfunctioning of critical components of the system.

The following table illustrates the steps that occur whenever a starting sequence is evoked:

(1) A keyboard button is pressed. Positive pulse is applied to base of Q6. Q6 cannot turn on due to Q7 being off.
(2) Microprocessor senses key closure through R00, R01, R02 or R03 inputs
(3) Microprocessor delays for 10 milliseconds
(4) Microprocessor confirms key closure when receives pulses at R00, R01, R02 or R03 (Debounce). Microprocessor shuts off digit strobes P12-P15, removing positive pulse to base of Q6.
(5) Microprocessor decodes key as a start key. Associated with that key is information stored in EAROM (electrically alterable read only memory) of microprocessor.
(6) Microprocessor loads information from EAROM.

(7) Microprocessor turns on relay K.
(8) Microprocessor delays 2 milliseconds. (Allows start supervisor input time to go low if fault condition is present). If no fault, input to D5 is high.
(9) Microprocessor tests relay K output through start supervisor. Relay output must be off. (No pulse applied to base of Q6 due to digit strobes being off).
(10) Microprocessor turns on digit strobes. Pulse is reapplied to base of Q6. (Keyboard may be released at this point).
(11) Microprocessor delays 10 milliseconds (electrical settling time).
(12) Microprocessor retests relay K output through start supervisor; programmed so must see a low level, i.e. is anything open.
(13) Microprocessor delays 3.2 seconds.
(14) Microprocessor tests relay K output through start supervisor; must see a low level. Must be opposite to #8. If not, control locks up.
(15) Microprocessor proceeds to turn on MC-1 then MC-2 by applying pulses to output ports D3 and D2.

If the above sequence is not successfully completed, the magnetron circuits will not be energized.

The following chart depicts anticipated failure modes and the resulting controller/oven response.

| STATUS OF OVEN WHEN FAILURE FIRST OCCURS | | | |
|---|---|---|---|
| Failure Mode | Oven Idle | Key Pressed, Cook Mode | During Cook Mode |
| Q5*Shorted | No response | Relay K pulses | Normal operation |
| Open | No response | Oven refuses to start | Oven stops cooking |
| Q6*Shorted | No response | Relay K pulses | Normal operation |
| Open | No response | Oven refuses to start | Oven stops cooking |
| Q7*Shorted | No response | Relay locks on | Fan stays on; opening door stops fan |
| Open | No response | Oven refuses to start | Oven stops cooking |
| Q8*Shorted | No response | Oven refuses to start | No noticeable response except for loss of full power cooking |
| Open | No response | Loss of full power cooking; no other response | Loss of full power cooking no other response |
| Q9*Shorted | No response | Oven refuses to start | No noticeable response except for loss of full power cooking |
| Open | No response | Loss of full power cooking no other response | Loss of full power cooking; no other response |

*Collector to emitter short (no similar condition for passive components).

An identification of and/or typical values for the components of the system 10, which are described hereinabove, are as follows:

| 14 | Microprocessor HMCS-44A |
|---|---|
| C16 | Capacitor, .047 mfd |
| C17 | Capacitor, .01 mfd |
| C18 | Capacitor, .47 mfd |
| C19 | Capacitor, .047 mfd |
| R39 | Resistor, 100K ohms |
| R40 | Resistor, 100K ohms |
| R41 | Resistor, 100K ohms |
| R42 | Resistor, 100K ohms |
| R43 | Resistor, 27K ohms |
| R44 | Resistor, 27K ohms |
| R45 | Resistor, 27K ohms |
| R46 | Resistor, 27K ohms |
| R47 | Resistor, 100K ohms |
| R48 | Resistor, 47K ohms |
| R49 | Resistor, 10K ohms |
| R50 | Resistor, 2.2K ohms |

-continued

| R51 | Resistor, 10K ohms |
|---|---|
| R52 | Resisior, 4.7K ohms |
| R53 | Resistor, 4.7K ohms |
| R54 | Resistor, 4.7K ohms |
| R55 | Resistor, 47K ohms |
| R56 | Resistor, 2.2K ohms |
| R57 | Resistor, 2.2K ohms |
| R58 | Resistor, 4.7K ohms |
| R59 | Resistor, 6.8K ohms |
| R60 | Resistor, 4.7K ohms |
| R61 | Resistor, 18 ohms |
| R62 | Resistor, 6.8K ohms |
| R63 | Resistor, 4.7K ohms |
| R64 | Resistor, 18 ohms |
| D13 | Diode, 1N4148 |
| D14 | Diode, 1N4148 |
| D15 | Diode, 1N4148 |
| D16 | Diode, 1N4148 |
| D17 | Diode, 1N4148 |
| D18 | Diode, 1N4148 |
| D19 | Diode, 1N4148 |
| D20 | Diode, 1N4148 |
| D22 | Diode, 1N4148 |
| D23 | Diode, 1N4148 |
| Z3 | Zener Diode, 22 volts |
| Q5 | Transistor, 2N2907A |
| Q6 | Transistor, 2N2222A |
| Q7 | Transistor, 2N2222A |
| Q8 | Transistor, 2N2222A |
| Q9 | Transistor, 2N2222A |
| SSR1 | Soild State Relay |
| SSR2 | Solid State Relay |

It will be understood, however, that these identifications and values may be varied depending upon the particular application of the principles of the present invention. While a preferred embodiment of the invention has been illustrated and described, it will be understood that various changes and modifications may be made without departing from the spirit of the invention.

What is claimed is:

1. A supervisory start system for an appliance control that includes a microprocessor, manually actuatable keyboard switch means, and first and second relay means;
the microprocessor including first, second and third input means and first, second and third output means and being conditioned to generate control signals at said output means upon receipt of electrical signals at said input means;

said supervisory start circuit comprising, in combination, first, second and third transistors each having a base, an emitter and a collector, said first transistor means controlling energization of said first relay means and being controlled by said manually actuatable switch means;

said manually actuatable switch means being electrically connected to said first output means of said microprocessor and said base of said first transistor;

the base of said second transistor being connected to said second output means of said microprocessor, the emitter of said second transistor being connected to a source of potential, the collector of said second transistor being connected to the emitter of said first transistor;

the collector of said first transistor being connected to said first relay means;

said second transistor being operable to connect the emitter of said first transistor to said source of potential when a signal from said second output means of said microprocessor is applied to the base of said second transistor;

said microprocessor being conditioned to emit a signal at said second output means upon receipt of a signal at said first input means;

means for latching said first transistor in a conducting condition upon being energized;

means for applying an electrical signal to said second input means when said first transistor means is in a conducting condition;

said third transistor having the base thereof connected to said third output means of said microprocessor, said third transistor having the emitter thereof connected to said source of potential and the collector thereof connected to said second relay means, said third transistor being operable to connect said relay means to said source of potential upon receipt of a signal from said third output means of said microprocessor; and said microprocessor being conditioned to emit a signal at said third output means upon receipt of a signal at said second input means.

2. The combination as set forth in claim 1 including first diode means connected to said keyboard switch means and the base of said first transistor.

3. The combination as set forth in claim 1 including second diode means connected to said keyboard switch means and said first output means of said microprocessor.

4. The combination as set forth in claim 1, said means for latching said first transistor in a conducting condition including a fourth transistor having a base, an emitter and a collector, the base of said fourth transistor being connected to the collector of said first transistor, the emitter of said fourth transistor being connected to said third input means of said microprocessor, the collector of said fourth transistor being connected to the base of said first transistor.

5. The combination as set forth in claim 1 including a high voltage load, said first and second relay means together being operable to control energization of said high voltage load.

6. The combination as set forth in claim 1, said controller being connected to a microwave oven having a magnetron, said first and second relay means together controlling energization of said magnetron.

7. The combination as set forth in claim 1, further comprising a display, said display being connected to said first output means of said microprocessor.

8. The combination as set forth in claim 1, said controller being connected to a microwave oven having an oven door, an oven door switch operably connected to open and close upon opening and closing of said oven door, and means connecting said oven door switch to said third input means to signal said microprocessor when said oven door switch is open and closed.

9. A supervisory start system for an appliance control that includes a microprocessor, manually actuatable keyboard switch means, and first and second relay means;

the microprocessor including first, second and third input means and first, second and third output means and being conditioned to generate control signals at said output means upon receipt of electrical signals at said input means;

said supervisory start circuit comprising, in combination, first, second and third transistors each having a base, an emitter and a collector, said first transistor means controlling energization of said first relay means and being controlled by said manually actuatable switch means;

said manually actuatable switch means being electrically connected to said first output means of said microprocessor and said base of said first transistor;

the base of said second transistor being connected to said second output means of said microprocessor, the emitter of said second transistor being connected to a source of potential, the collector of said second transistor being connected to the emitter of said first transistor;

the collector of said first transistor being connected to said first relay means;

said second transistor being operable to connect the emitter of said first transistor to said source of potential when a signal from said second output means of said microprocessor is applied to the base of said second transistor;

said microprocessor being conditioned to emit a signal at said second output means upon receipt of a signal at said first input means;

means for latching said first transistor in a conducting condition upon being energized;

means for applying an electrical signal to said second input means when said first transistor means is in a conducting condition;

said third transistor having the base thereof connected to said third output means of said microprocessor, said third transistor having the emitter thereof connected to said source of potential and the collector thereof connected to said second relay means, said third transistor being operable to connect said second relay means to said source of potential upon receipt of a signal from said third output means of said microprocessor;

said microprocessor being conditioned to emit a signal at said third output means upon receipt of a signal at said second input means; and first diode means connected to said keyboard switch means and the base of said first transistor.

10. The combination as set forth in claim 9 including second diode means connected to said keyboard switch means and said first output means of said microprocessor.

11. The combination as set forth in claim 10, wherein said means for latching said first transistor in a conducting condition includes a fourth transistor having a base, an emitter and a collector, the base of said fourth transistor being connected to the collector of said first transistor, the emitter of said fourth transistor being connected to said third input means of said microprocessor, the collector of said fourth transistor being connected to the base of said first transistor.

12. The combination as set forth in claim 11 including a high voltage load, said first and second relay means together being operable to control energization of said high voltage load.

13. The combination as set forth in claim 11, said controller being connected to a microwave oven having a magnetron, said first and second relay means together controlling energization of said magnetron.

14. The combination as set forth in claim 13, further comprising a display, said display being connected to said first output means of said microprocessor.

15. The combination as set forth in claim 14, said controller being connected to a microwave oven having an oven door, an oven door switch operably connected to open and close upon opening and closing of said oven door, and means connecting said oven door switch to said third input means to signal said microprocessor when said oven door switch is open and closed.

* * * * *